J. F. HALBACH.
AUTO WHEEL PROTECTOR.
APPLICATION FILED JUNE 5, 1919.
1,393,528.
Patented Oct. 11, 1921.
3 SHEETS—SHEET 1.
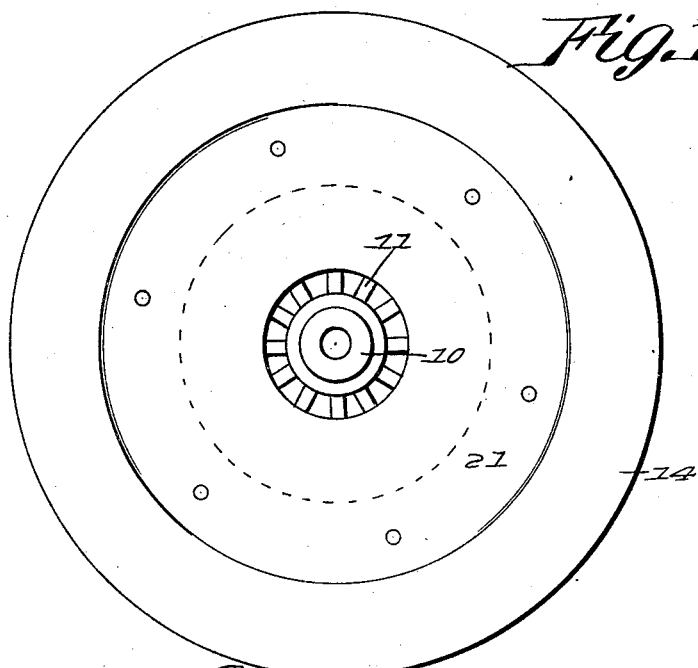
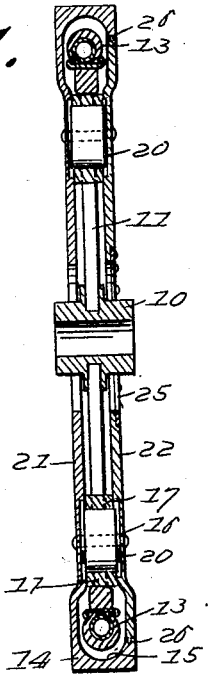
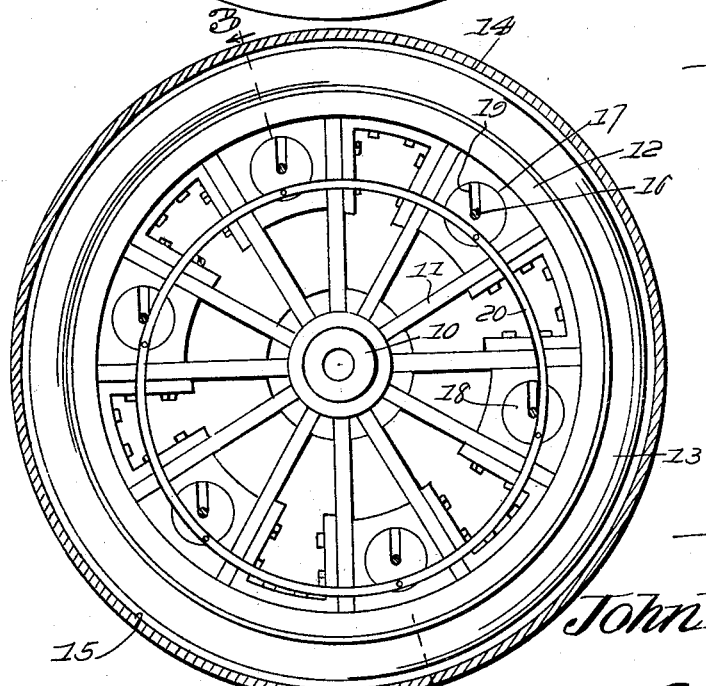
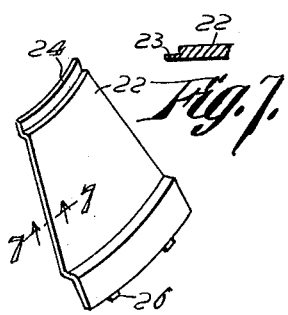
Inventor
John F. Halbach,
By G. Hume Talbert
Attorney

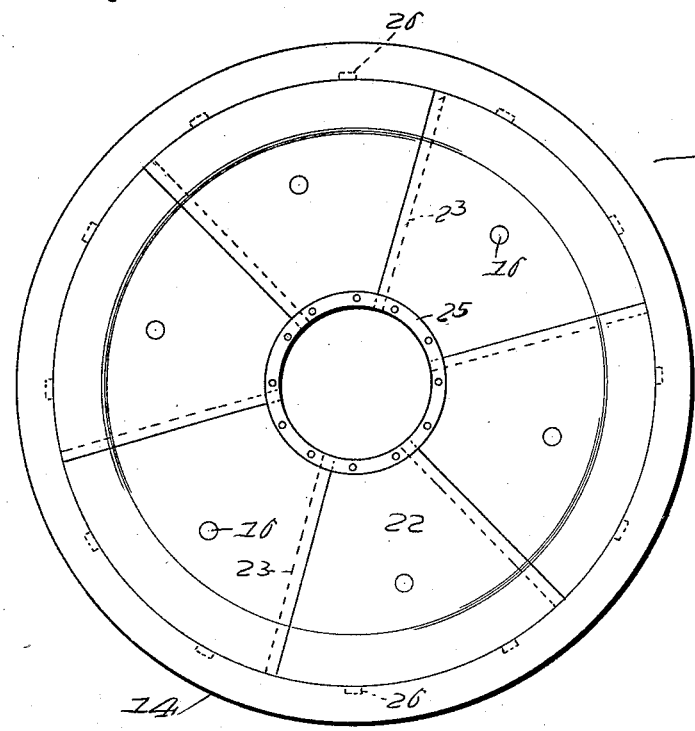
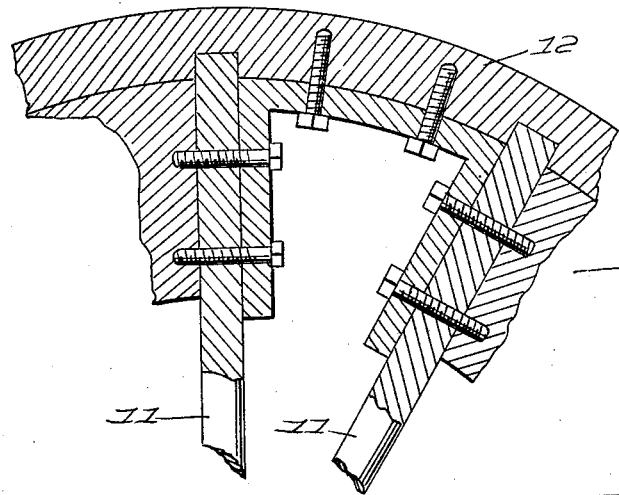

J. F. HALBACH.
AUTO WHEEL PROTECTOR.
APPLICATION FILED JUNE 5, 1919.

1,393,528.  Patented Oct. 11, 1921.
3 SHEETS—SHEET 3.

Inventor
John F. Halbach,
By G. Hume Talbert
Attorney

UNITED STATES PATENT OFFICE.

JOHN F. HALBACH, OF PHILADELPHIA, PENNSYLVANIA.

AUTO-WHEEL PROTECTOR.

1,393,528.  Specification of Letters Patent.  Patented Oct. 11, 1921.

Application filed June 5, 1919. Serial No. 301,946.

*To all whom it may concern:*

Be it known that JOHN F. HALBACH, a citizen of the United States of America, residing at Philadelphia, in the county of Philadelphia and State of Pennsylvania, has invented new and useful Improvements in Auto-Wheel Protectors, of which the following is a specification.

The object of the invention is to provide a shoe or protecting casing for automobile and other vehicle wheels as a means of relieving the wheel tire of a large proportion of the wear and strain incident to its use under ordinary conditions, as a means of cushioning jars and shocks incident to traversing rough roads and thereby relieving not only the wheel tire and the wheel itself but also the running gear of the vehicle, as a means of increasing the active tread surface of the vehicle wheel so as to distribute the pressure applied thereto by reason of the load imposed by or through the vehicle as a means of preventing puncture of and other similar injury to wheel tires of the pneumatic type, and of minimizing the skidding of pneumatic and other cushion tires and of insuring an effective traction of the driving wheels of a power driven vehicle by cushioning the starting and stopping movements thereof and thus preventing the slipping or sliding of the wheel tire on the road surface, and as a means of protecting the wheel structure from contact with adjacent objects and against accumulations of sand, dirt and other foreign substances at and near the rim and from moisture, oils, tar and other road surfacing materials.

With these and related objects in view as will appear in the course of the following description of a preferred embodiment of the invention, the same consists of a construction, combination and relation of parts illustrated in the accompanying drawings, it being understood that changes in form, proportion and details may be resorted to within the scope of the claims without departing from the principles involved.

In the drawings:

Figure 1 is an inner side view of a wheel provided with a protecting shoe.

Fig. 2 is a similar view of the wheel showing the shoe in section.

Fig. 3 is a transverse section on the plane indicated on the line 3—3 of Fig. 2.

Fig. 4 is an outer side view of the structure.

Fig. 5 is a detail section showing the connections between the wheel spokes and the rim.

Fig. 6 is a detail view of one of the sector shaped sections of the outer wall of the shoe.

Fig. 7 is a detail sectional view of the joint between the sections of the outer shoe wall taken on a plane indicated by line 7—7 of Fig. 6.

Figure 8:
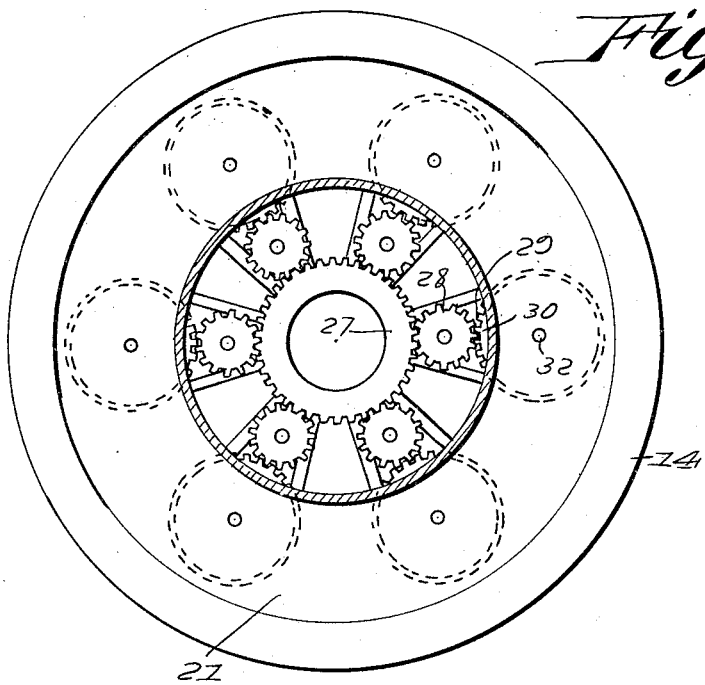
Fig. 8 is an inner side view of a wheel and protecting shoe embodying a modified means for maintaining a uniform relation between the motion transmitting means by which the wheel and shoe are connected.

The wheel having a hub 10, spokes 11, rim 12 and tire 13, herein shown as of the pneumatic type, is incased within a shoe 14 having an internal concave tread surface 15 for coöperative relation with the external tread surface of the wheel tire, the respective diameters of said coöperative tread surfaces being such that the compression of the tire due to the weight of the machine and its load, and which varies to a greater or less extent, according to the weight of the load and the resistance offered by the pressure in the tire, involves a disalinement or relative movement of the axes of the wheel and shoe, and causes an engagement or a bearing contact of a considerable area of the wheel tire upon the inner surface of the shoe, or in other words, produces a coöperative bearing contact of the tread surfaces of the tire and shoe which may approximate $\frac{1}{3}$ of the diameter of the tire. This extended contact of the outer and inner tread surfaces respectively of the wheel tire and shoe results in a depression of the center of gravity of the load as transmitted from the wheel to the shoe, and at the same time increases the frictional relation between the tread surfaces so as to minimize the tendency of one of said members to turn independently of the other and maximize the tendency of one to communicate its rotary motion to the other, according to whether the structure embodies a driving wheel or a driven or steering wheel.

In addition to the possibility of relative movement of the wheel and shoe vertically by reason of the weight of the machine and its load transmitted to the wheel through the axle in the ordinary way, there is a possibility by reason of the relation between the parts as described of movement in other directions, namely, forwardly and rearwardly of one of said members but obviously, by reason of the connection between the same, such movement is always in a plane perpendicular to the axes of said wheel and shoe, so that upon encountering an obstacle such as a projection or depression in the surface of the road traversed there will be a compensatory movement serving to cushion the jar or shock communicated from the shoe to the wheel which serves to relieve the latter and hence not only minimizes the strain upon the wheel tire and the wheel itself and the running gear of the vehicle but also the occupants of the latter or the load transported thereby.

It is desirable, however, to insure within certain limits adapted to vary this cushioning effect, a substantially uniform synchrony of rotary movement between the wheel and shoe so that there may be no frictional relative movement between the coöperating tread surfaces of the tire and shoe and no relative creeping movement of the said members, and moreover, it is desirable in this connection while permitting relative freedom of movement of one member with reference to the other in a vertical or substantially vertical direction or in a direction perpendicular to the horizon and while permitting a sufficient movement in other directions in a plane perpendicular to the axes of said members, to provide guiding means which will serve under these varying relations to insure a substantially uniform synchronous rotary movement of the members. Hence there is employed an interlocking relation between the wheel and the shoe which consists in providing them with male and female coöperating elements such as pins 16 and seats 17 one of which elements is carried by the wheel and the other by the shoe. In the construction illustrated the pins are carried by the shoe and project parallel with the axes of the members to operate in the seats 17 so as to limit the movement of one member relative to the other. It is obvious that the range of movement of the pins will be determined by the areas of the seats, but in order to minimize the movement thereof except in a direction perpendicular to the plane of the horizon, these seats are fitted with disks 18 having radial slots forming elongated seats 19 for the reception of the pins 16, said disks being yieldingly maintained in a normal position with relation to the axis of rotation so as to yieldingly hold the seats 19 in a normal position with relation to the plane of the horizon, and to this end as shown in Fig. 2 the disks are connected by links 20 which may as illustrated form the elements of a continuous ring pivoted at spaced points to the disks in corresponding relations to the radial seats 19 therein. This means of connection while permitting turning movement to a limited extent of the disks with relation to the wheel and hence deflection to a limited extent of the guide seats 19 from a vertical position, insures the prompt return of the parts to the normal position indicated in Fig. 2 in which the seats 19 which constitute guides for the pins are vertical and therefore permit free relative vertical movement of the wheel and shoe within the limits of elasticity of the tire with which the former is provided.

The shoe is preferably extended at the sides of the wheel to form the inner and outer walls 21 and 22 which house the wheel and thus protect the tire and rim portions thereof, and the outer casing wall is preferably formed in sectoral sections of which one element is illustrated in detail in Fig. 6 and which are provided with overlapping rabbeted joints 23, an inner flange 24 for engagement with a ring 25 and outer lugs 26 for engagement with the tread portion of the shoe.

Figure 9:
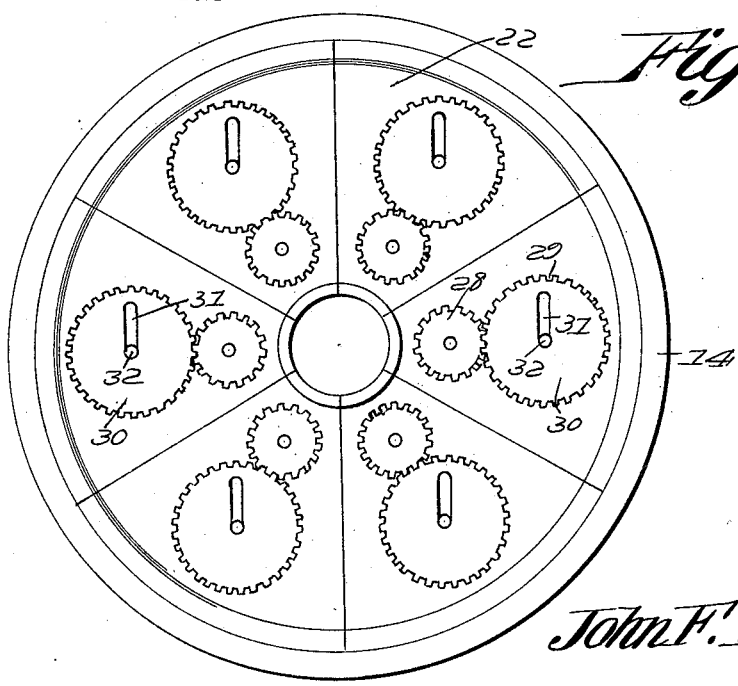
Fig. 9 is a view of the shoe shown in Fig. 8, the wheel being omitted and indicating the relative arrangement of the planetary disks and means whereby motion is communicated thereto.

The means for securing synchronous movement of the wheel and shoe while maintaining a normal position of the pin guides serving to preserve the interlocking relation between the members may be modified as shown in Figs. 8 and 9 by providing the wheel axle if dead, or the axle casing if alive, with a sun gear 27 with which mesh gears 28 in turn meshing with peripheral teeth 29 of the planetary disks indicated at 30, said disks as in the construction shown in Fig. 2, being provided with the radial slots 31 for receiving the pins 32.

The invention having been described, what is claimed as new and useful is:

1. A wheel having a rim member and a shoe member capable of relative movement in a plane perpendicular to their axes, and orbitally movable interlocking means having complemental elements relatively movable in parallelism with and carried respectively by said members for communicating rotary motion from one to the other.

2. A wheel having a rim member and a shoe member capable of relative movement in a plane perpendicular to their axes, and orbitally movable interlocking means having complemental elements relatively movable in normal relation to the plane of the horizon in parallelism with and carried respectively by said members for communicating rotary motion from one to the other.

3. A wheel having a rim member and a shoe member capable of relative movement in a plane perpendicular to their axes, and orbitally movable interlocking means having complemental elements relatively movable in parallelism with and carried respectively by said members for communicating rotary motion from one to the other, said elements consisting of a revoluble disk and a pin operating in a guide thereon.

4. A wheel having a rim member and a shoe member capable of relative movement in a plane perpendicular to their axes, and orbitally movable interlocking means having complemental elements relatively movable in parallelism with and carried respectively by said members for communicating rotary motion from one to the other, one of said elements consisting of a disk revoluble upon its own axis and the other being movable in a tangential relation thereto.

5. A wheel having a rim member and a shoe member capable of relative movement in a plane perpendicular to their axes, and orbitally movable interlocking means having guide carrying revoluble disks and elements engaging and movable with relation to the guides of the disks, the latter being held with their guides in normal relation to the plane of the horizon.

6. A wheel having a rim member and a shoe member capable of relative movement in a plane perpendicular to their axes, and orbitally movable interlocking means having radially slotted revoluble disks and pins engaging and movable with relation to the slots of the disks, the latter being held with their slots in normal relation to the plane of the horizon.

7. A wheel having a rim member and a shoe member capable of relative movement in a plane perpendicular to their axes, and orbitally movable interlocking means having revolubly mounted guides and elements engaging and movable relative to the guides, and means for holding the guides in a normal relation to the plane of the horizon.

8. A wheel having a rim member and a shoe member capable of relative movement in a plane perpendicular to their axles, and orbitally movable interlocking means having revolubly mounted guides and elements engaging and movable relative to the guides, and connections between the guides for holding them in normal relative positions.

9. A wheel having a rim member and a shoe member capable of relative movement in a plane perpendicular to their axes, and orbitally movable interlocking means having revolubly mounted guides and elements engaging and movable relative to the guides, and links connecting the guides for maintaining them in normal relative positions.

In testimony whereof he affixes his signature.

JOHN F. HALBACH.